United States Patent
Hutchinson

(10) Patent No.: US 7,075,590 B1
(45) Date of Patent: Jul. 11, 2006

(54) APPARATUS FOR PROVIDING TELEVISION RECEIVER ALIGNMENT FUNCTIONS

(75) Inventor: Daniel Mark Hutchinson, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/806,214

(22) PCT Filed: Sep. 30, 1999

(86) PCT No.: PCT/US99/22760

§ 371 (c)(1),
(2), (4) Date: Mar. 27, 2001

(87) PCT Pub. No.: WO00/19717

PCT Pub. Date: Apr. 6, 2000

Related U.S. Application Data

(60) Provisional application No. 60/102,429, filed on Sep. 30, 1998.

(51) Int. Cl.
*H04N 3/24* (2006.01)
*H04N 5/44* (2006.01)
*H04N 5/52* (2006.01)

(52) U.S. Cl. ............ 348/678; 348/634; 348/635; 348/725

(58) Field of Classification Search ............ 348/678, 348/634–637, 725–727; H04N 3/24, 5/44, H04N 5/52
See application file for complete search history.

(56) References Cited

U.S. PATENT DOCUMENTS

| 4,323,795 A | | 4/1982 | Holloway et al. |
| 4,384,277 A | | 5/1983 | Allgood et al. |
| 4,434,439 A | | 2/1984 | Steckler et al. |
| 4,484,149 A | | 11/1984 | Holloway |
| 4,628,362 A | * | 12/1986 | Waehner .................. 348/572 |
| 4,706,108 A | | 11/1987 | Kumagai et al. |
| 4,799,106 A | * | 1/1989 | Moore et al. ............ 348/619 |
| 4,851,838 A | | 7/1989 | Shier |
| 4,860,103 A | * | 8/1989 | Azam et al. ............. 348/572 |
| 4,963,969 A | * | 10/1990 | Kitaura et al. .......... 348/572 |
| 4,991,023 A | * | 2/1991 | Nicols .................... 348/554 |
| 5,036,387 A | * | 7/1991 | Umezawa ................ 348/635 |
| 5,079,623 A | * | 1/1992 | Sendelweck et al. ...... 348/678 |

(Continued)

FOREIGN PATENT DOCUMENTS

EP      0567343      10/1993

OTHER PUBLICATIONS

Y. Yamamoto et al., "A New Video Processor for Color TV", IEEE Transactions on Consumer Electronics, vol. 343, No. 3, Aug. 1, 1988, pp. 443-450.

*Primary Examiner*—Brian P. Yenke
(74) *Attorney, Agent, or Firm*—Joseph J. Laks; Robert D. Shedd; Brian J. Cromarty

(57) ABSTRACT

A method and apparatus within a television receiver for electronically aligning signals within the receiver by controlling support circuitry for an IF module. A control voltage source controls both video alignment and picture IF (PIF) mute functions. The DAC is coupled to a video level control circuit within the video amplifier circuitry of the television receiver. The control signal controls both the video level as well as a PIF mute circuit.

12 Claims, 6 Drawing Sheets

U.S. PATENT DOCUMENTS

| | | | |
|---|---|---|---|
| 5,124,980 A | 6/1992 | Maki | |
| 5,173,774 A | 12/1992 | Bretl et al. | |
| 5,231,314 A | 7/1993 | Andrews | |
| 5,546,138 A * | 8/1996 | Krishnamurthy et al. | 348/735 |
| 5,635,935 A | 6/1997 | Ignowski et al. | |
| 5,657,078 A * | 8/1997 | Saito et al. | 348/180 |
| 5,682,162 A | 10/1997 | Hamasaki et al. | |
| 5,699,011 A * | 12/1997 | Sgrignoli | 329/350 |
| 5,699,127 A * | 12/1997 | Ando et al. | 348/678 |
| 6,008,842 A * | 12/1999 | Nagata | 348/173 |
| 6,046,721 A * | 4/2000 | Song et al. | 345/13 |
| 6,219,107 B1 * | 4/2001 | Renner et al. | 348/678 |
| 6,226,037 B1 * | 5/2001 | Griepentrog | 348/379 |
| 6,545,728 B1 * | 4/2003 | Patel et al. | 348/725 |
| 6,738,098 B1 * | 5/2004 | Hutchinson | 348/691 |

* cited by examiner

APPARATUS FOR PROVIDING TELEVISION RECEIVER ALIGNMENT FUNCTIONS

This application claims the benefit of U.S. provisional application serial No. 60/102,429 filed Sep. 30, 1998, which is hereby incorporated herein by reference, and which claims the benefit under 35 U.S.C. § 365 of International Application PCT/US99/22760, filed Sep. 30, 1999, which was published in accordance with PCT Article 21(2) on Apr. 6, 2000 in English.

BACKGROUND OF THE DISCLOSURE

Field of the Invention

The invention relates to television receivers and, more particularly, the invention relates to television receivers having a system microprocessor and a bus interface that facilitate a plurality of controllable functions for aligning the signals within the receiver.

BACKGROUND OF THE INVENTION

In modern television receivers, a microprocessor provides command and control information through an I²C bus interface to provide various control functions. The I²C bus is coupled to a module (an IF integrated circuit) comprising a tuner, IF, and stereo decoder. To achieve the best picture and sound performance, the microprocessor may have to control 8 or more alignment functions and various switch functions through the I²C bus interface. These functions provide factory alignment of various signal characteristics such as video output amplitude and DC level, RF AGC delay threshold, and the like. Such electronic alignment is performed to ensure that a consistent picture quality between televisions occurs in retail show rooms; to ensure that consistent picture equality results between inputs of a television with multiple tuners or multiple auxiliary inputs; and to maintain signal levels within dynamic range limitations of the receiver circuitry.

There is a need in the television receiver art for an economical solution that enables a system microprocessor to control a plurality of functions of the receiver to achieve accurate signal alignment.

SUMMARY OF THE INVENTION

The present invention is a method and apparatus within a television receiver for electronically aligning signals within the receiver by controlling support circuitry for a module comprising a tuner, IF and a stereo decoder. The invention uses a digital-to-analog converter (DAC) integrated circuit to control a plurality of alignment and switching functions within a television receiver. In one embodiment of the invention, a system microprocessor is coupled through an I²C bus to a DAC that controls both video alignment and picture IF (PIF) mute functions. The DAC output is coupled to both a PIF mute circuit that in turn controls the IF AGC, i.e., switches the IF AGC off or on. The DAC is also coupled to a video level control circuit that controls the IF AGC gain. Using a six bit control signal, the microprocessor can control both the video level as well as the PIF mute circuit.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
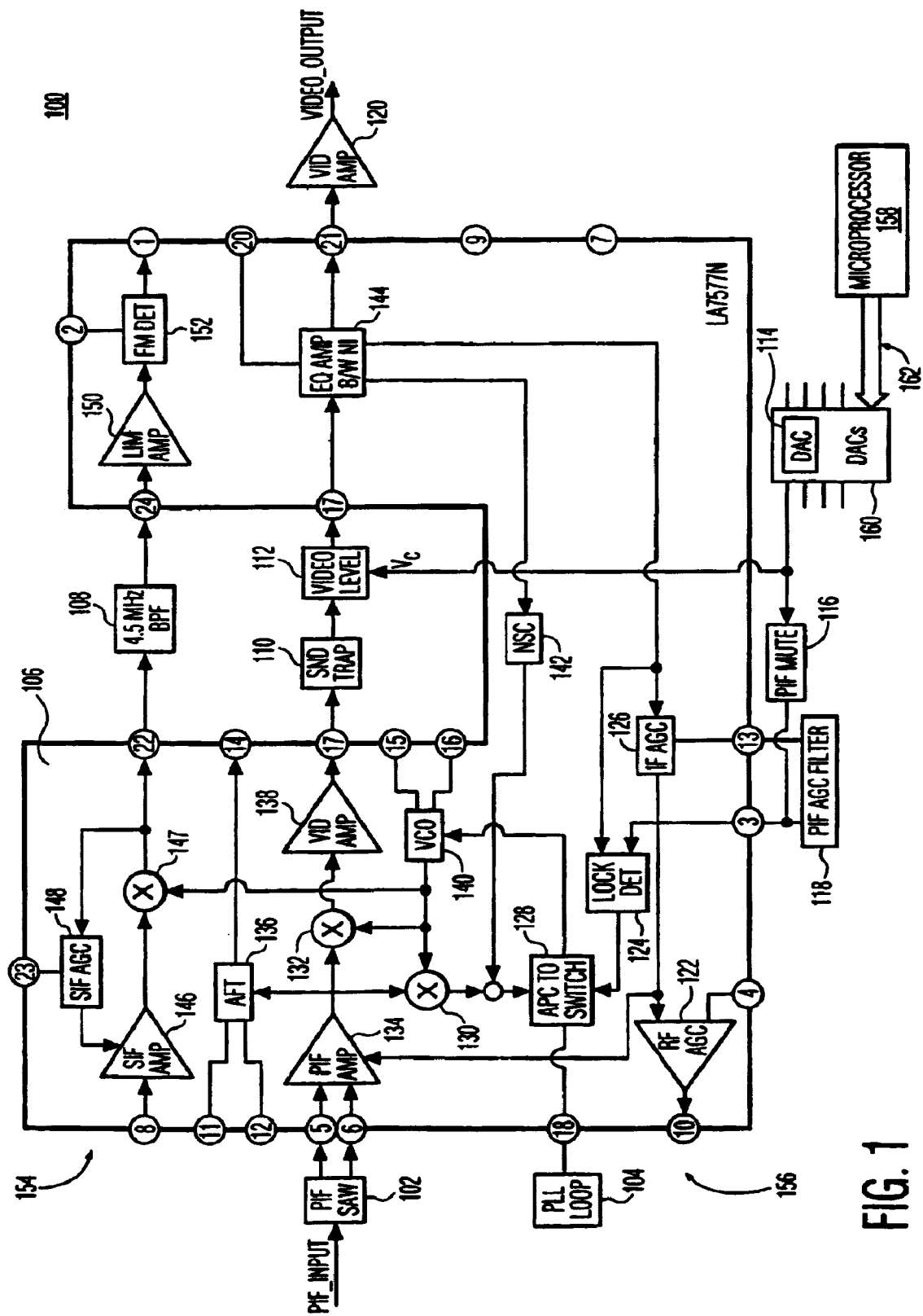
FIG. 1 depicts a portion of a television receiver that is arranged in accordance with the present invention.

FIG. 1 depicts a block diagram of a portion 100 of a television receiver comprising a signal processing module 106 as well as components of the present invention that support the operation of the module. The signal processing module 106 is, for example, a model LA7577N module manufactured by Sanyo Corporation. The module 106 comprises an IF circuitry for both sound (SIF) and picture (PIF). The audio circuitry portion 154 of the module 106 comprises an SIF amplifier 146 and SIF AGC 148, down converter 147 (mixer), a limiting amplifier 150 and an FM detector 152. Supporting the audio circuitry 154 is a 4.5 MHz bandpass filter 108. The audio circuitry 154, although it is a part of the television receiver module 106, forms no part of the present invention.

The video portion 156 of the module 106 comprises a PIF amplifier 134, a video detector 132, a phase detector 130, a voltage controlled oscillator (VCO) 140, an internal video amplifier 138, an equalization amplifier 144, an Nyquist slope canceller 142, an APC switch 128, a lock detector 124, and IF AGC circuit 126 and an RF AGC amplifier 122. Supporting the video portion 156 of the module 106 is a PIF saw filter 102, a phase lock loop filter 104, a PIF AGC filter 118 and an external video amplifier 120 at the output of the module 106, as well as a sound trap 110 and a video level circuit 112. The IF video input is coupled to the PIF SAW filter 102 that filters the video signal. The SAW filtered video is amplified in IF amplifier 134, then down converted to baseband using the mixer 132. The mixer 132 is driven by the voltage controlled oscillator (VCO) 140. The baseband video is amplified by internal video amplifier 138. The amplified signal is filtered by the sound trap 110 and applied to the input of the video level control circuit 112. The operation of the video level control circuit 112 affects the IF AGC 126 which in affects the gain of the PIF Amp 134 and, thus, the video signal amplitude. The output of the video level control circuit 112 is applied to the equalization amplifier 144. The output of the equalization amplifier 144 is further amplified by video amplifier 120 to form the video output signal. The output of the PIF AGC filter is coupled to the lock detector 124 that drives the APC switch 128. The APC switch 128 selects the mode of operation for the PLL loop filter, i.e., whether the filter is operated in broad band mode (used during signal acquisition) or narrow band mode (used after PLL lock). The system microprocessor 158 couples digital control signals to DAC 114 that, in turn, controls the operation of both the level circuit 112 and the PIF mute 116.

It is important to note that the video level circuit is within the IF AGC loop and the IF amplifier gain is set by detecting the sync-tip level. As such, a change in the DC level of the video signal, as performed by the level circuit 112, changes the sync-tip level and the IF AGC loop gain. Consequently, a change in DC level controls the amplitude of the video signal.

The invention supports the module 106 through video level circuit 112 and PIF mute circuit 116, and an integrated circuit 160 containing a plurality (eight) digital-to-analog converters. In accordance with the present invention, a single DAC 114 within the integrated circuit 160 is used to control both the video level control circuit 112 and the PIF mute circuit 116. The DACs 160 are controlled by the system microprocessor 158 via the system I$^2$C serial bus 162.

The specific interconnections shown in FIG. 1 are representative of the interconnections within the LA7577N module 106. Those skilled in the art will realize that the inventive use of a digital-to-analog converter for controlling both the video alignment and the PIF mute functions could be used with many other arrangements of PIF circuitry. Similarly, the inventive video amplifier 120 and video level circuit 112 described below could be used in many other video processing applications.

The DAC 114 operates using 6 bits of input digital information to provide a variable analog output which is used to control both the PIF mute circuit 116 and the video level circuit 112. Alternatively, the DAC output, or the output of another DAC or other control voltage source, can be used to control the external video amplifier 120 (described below with respect to FIGS. 7 and 8). With respect to the invention, the system microprocessor, the I$^2$C bus and DAC or DACs collectively form a control voltage source or sources (collectively identified as reference number 160).

A DAC 114 that fulfills the functions of the present invention is a TDA 8444 manufactured by Phillips Corporation; however, other DACs and or control voltage generation circuits could be used. The output of the DAC 114 is coupled to the video level control circuit 112. This circuit is in essence a DC level shifter that sets the input DC level of the video signal into the equalization amplifier 144 of the module 106. The accuracy of this DC level into the equalization amplifier is critical for proper operation of the video processing circuits down stream from the video amplifier 120 as well as to achieve proper operation of the IF AGC circuit. In the present invention less than six bits of the digital information are used for controlling the video DC level which is sufficient for the LA7577N. More or less bits could be used for other applications as those skilled in the art would easily understand. The same output from the DAC 114 that is coupled to the video level circuit 112 is also coupled to a PIF mute circuit 116.

The PIF mute circuit 116 sets the IF amplifier gain to minimum by pulling the IF AGC control voltage to ground. This function is used in the factory and field service to align the VCO free run frequency. In television receivers with auxiliary inputs, the PIF mute circuit 116 can also be used, if necessary, to prevent cross talk from the tuner IF video signal to the selected auxiliary input signal. In the present invention, the PIF mute function also sets the tuner RF amplifier gain to minimum because the RF AGC control voltage (pin 10) of module 106 is pulled to ground when the IF AGC control voltage is pulled below the reference voltage determined by the RF AGC delay alignment. This results in more effective muting than if only the IF amplifier is set to a minimum gain.

Using the circuitry described above, a single DAC 114 can be used for two functions if the two functions are a) complimentary or b) never used at the same time, but, when used, do not interfere with one another. Complimentary functions are those that are intended to be used at the same time. The video alignment and PIF mute functions are complimentary because a) the PIF mute must be deactivated whenever the video output must be set to the proper alignment point; and b) it is the intent to minimize the video output whenever the PIF mute is active. As such, a single DAC 114 can be used to control both the PIF mute circuit 116 and the video level circuit 112.

Figure 2:
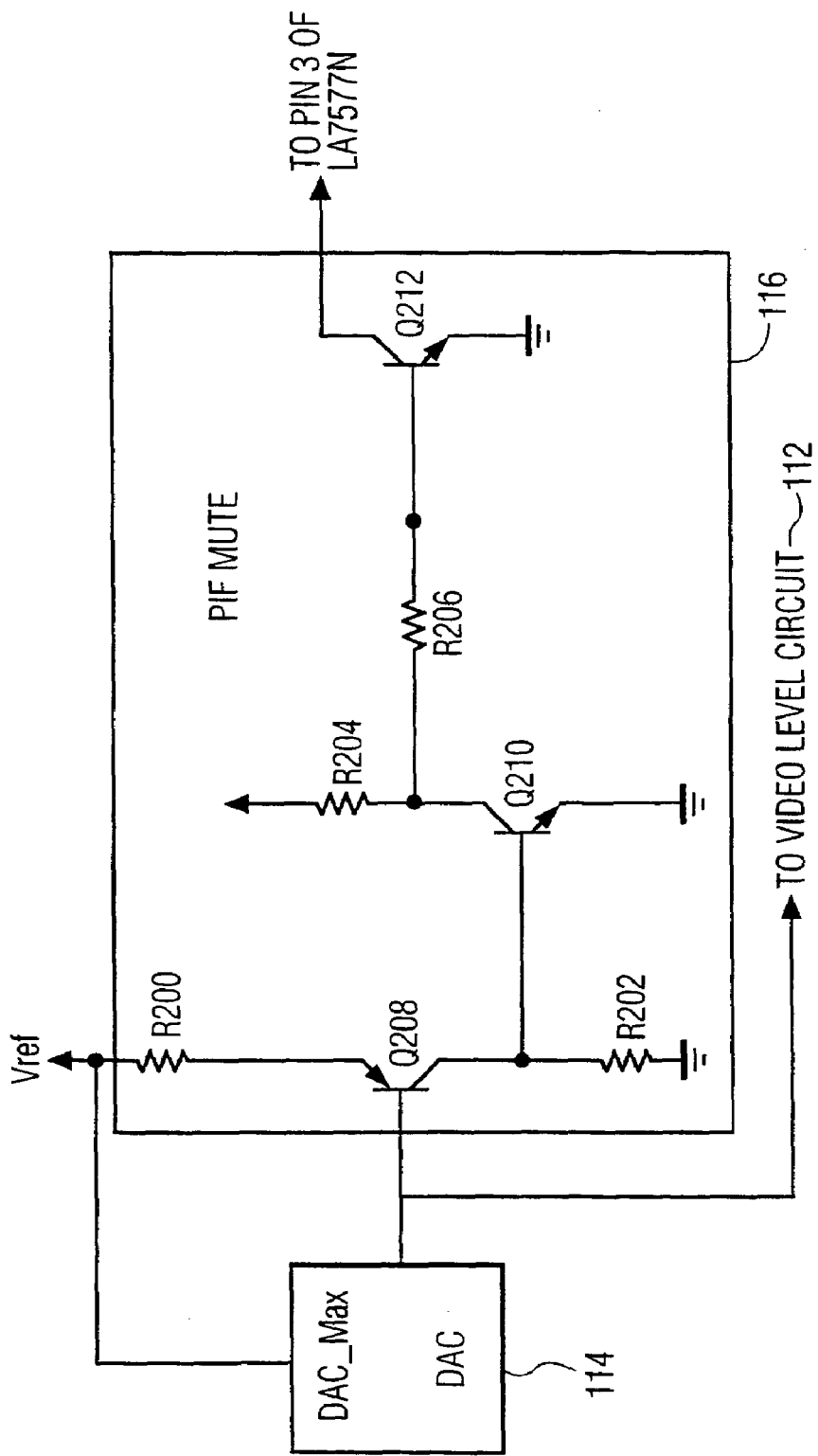
FIG. 2 depicts a schematic circuit of a PIF mute circuit.

FIG. 2 depicts a schematic diagram of the PIF mute circuit 116. The output of the DAC 114 is coupled to the base of transistor Q203. This transistor has an emitter coupled to $V_{ref}$ through resistor R200 and the collector of transistor Q203 is coupled to ground through resistor R202. The collector is also coupled to the base of transistor Q210 which forms a common emitter circuit having the collector coupled to a power supply through resistor R204. The collector of transistor Q210 is coupled through resistor R208 and to the base of transistor Q212.

The emitter of Q208 is pulled up to the reference voltage that sets the PIF mute switch point to approximately 1 $V_{BE}$ below the maximum DAC output voltage. This guarantees switch operation using less than 1 bit of DAC range, while preserving as much DAC range as possible for video DC level control. The DAC output voltage is minimum when the DAC input value is 0 and maximum when the DAC input value is 63.

Figure 3:
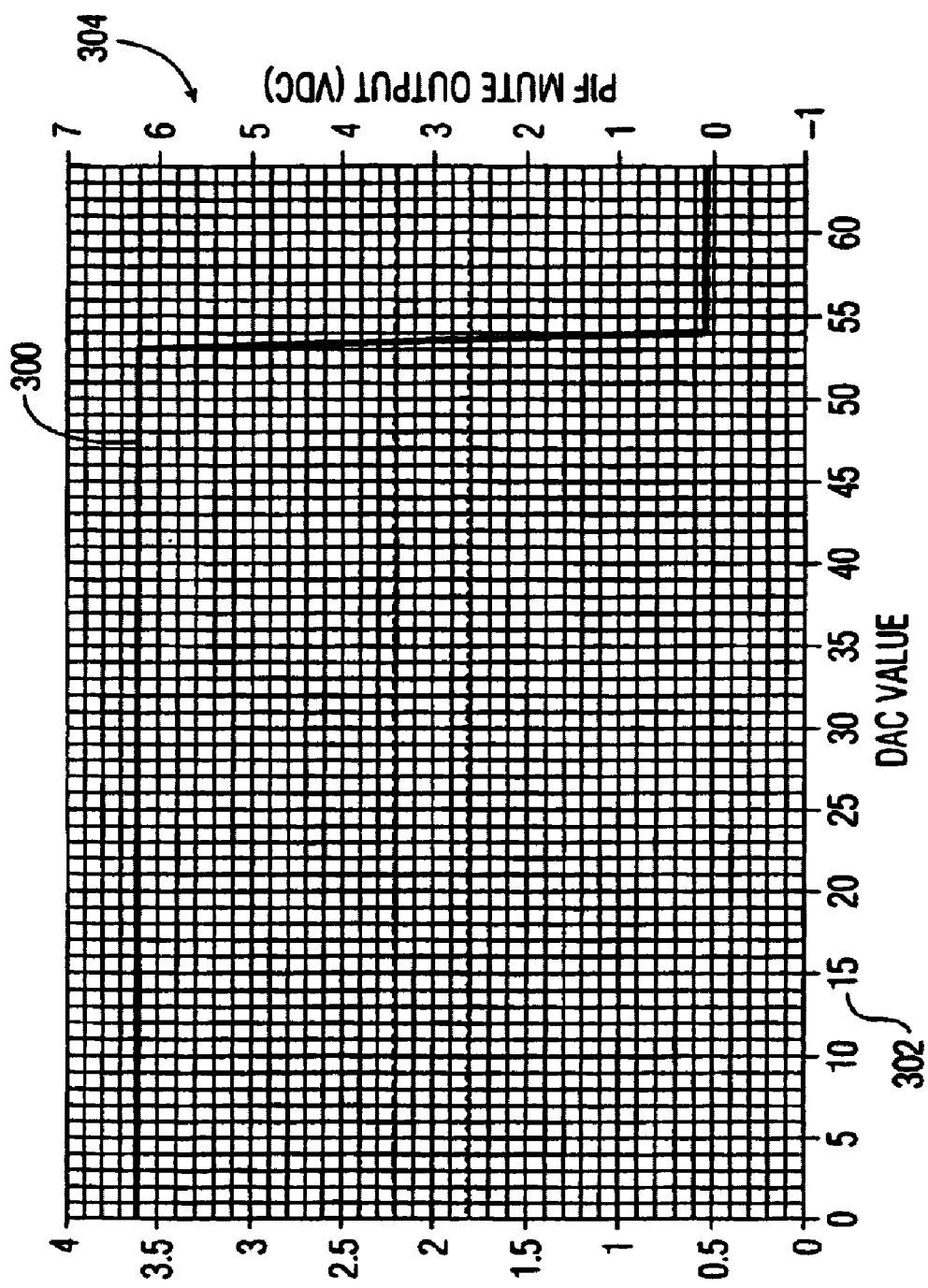
FIG. 3 depicts a graph of the control voltage (DAC value) versus the PIF mute output.

FIG. 3 depicts a typical characteristic curve 300 representing operation of the PIF mute circuit 116. The horizontal axis 302 depicts the control voltage (digital DAC values ranging from 0 to 63) and the PIF mute output voltage is shown on the right axis 304. For best understanding of the invention, FIGS. 2 and 3 should be referred to simultaneously. For DAC values less than 53, transistor Q212 is off and the PIF mute output voltage is determined by the IF AGC loop. At this DAC level, the DAC only controls the video DC level (as described below). For DAC values greater than or equal to 53, transistor Q212 is on and the PIF mute output pulls the AGC control signal to ground and the video output of the module 106 is minimized. While the video output is muted, the VCO free-run frequency is adjusted and the auxiliary inputs can be tested.

Figure 4:
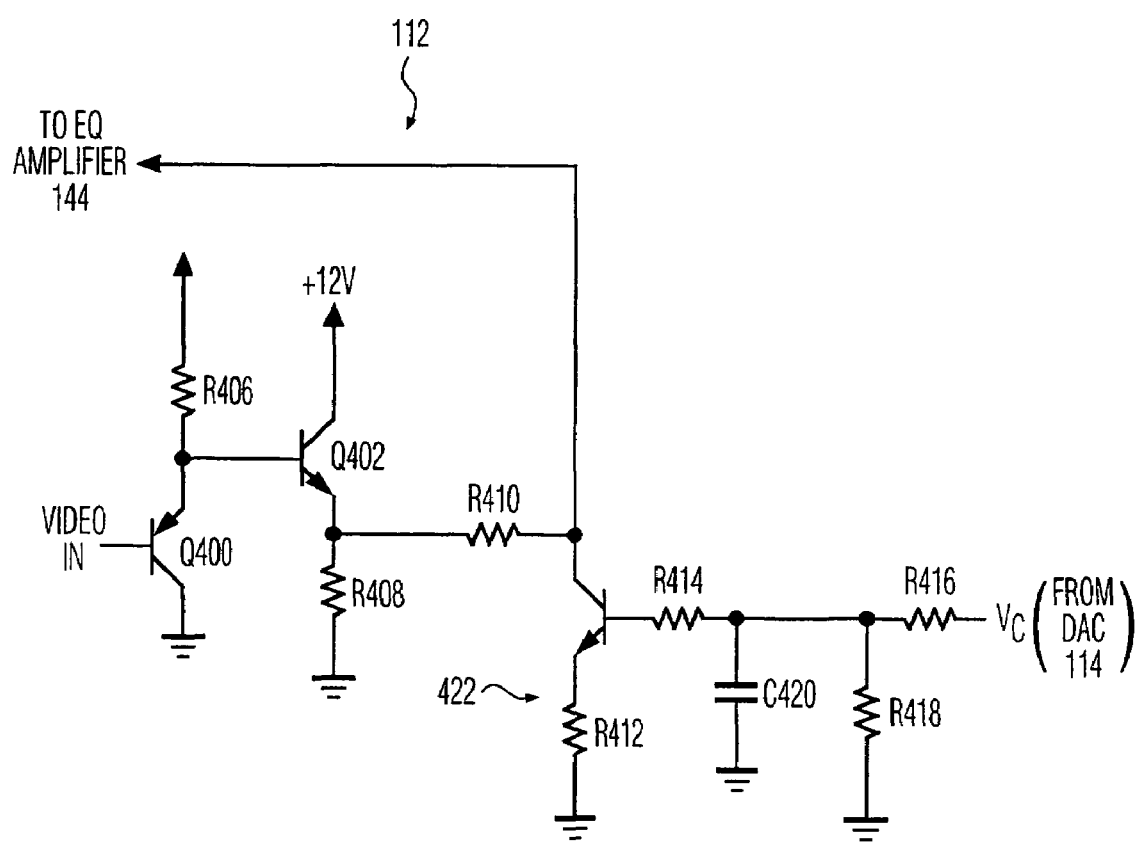
FIG. 4 is a schematic diagram of the video level control circuit.

FIG. 4 depicts an embodiment of a video level circuit 112 of FIG. 1. This circuit 112 can be used in a television receiver arrangement described above, where a single DAC 114 drives both the PIF mute circuit 116 and the video level control circuit or it can be used in a more traditional setting where the video level control circuit 112 is controlled by its own control voltage source.

In FIG. 4, transistors Q300 and Q302 isolate the DC level shift circuit 322 from the 4.5 Mhz soundtrap (110 in FIG. 1). Transistor Q300 is used to offset the $V_{BE}$ drop of transistor Q302 which also minimizes temperature drift of the circuit 112. The DC voltage at the emitter of transistor Q302 is constant and the collector is coupled to ground through resistor R308. Therefore the DC level shift between Q302 emitter and the AGC detector input at pin 19 of module 106 of FIG. 1 depends on the value of R310 and the DC current determined by the current source comprising transistor Q304 and resistor R312. The current is controlled by voltage Vc, the output of a DAC, connected to R316. Capacitor C320 filters any noise that may be present at the DAC output.

Figure 5A:
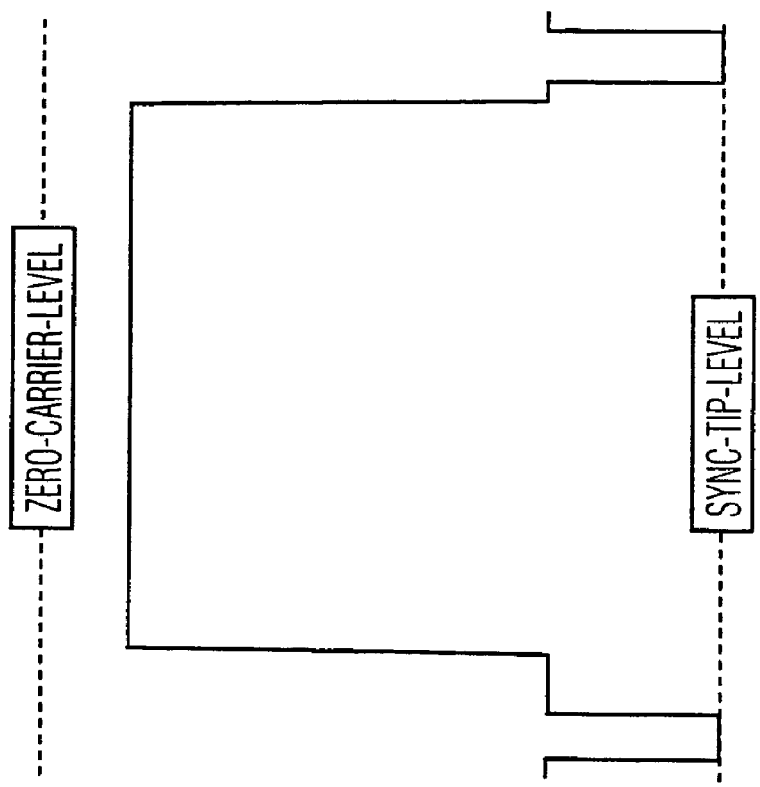
FIG. 5A is a graphical depiction of an output signal of the video level control circuit for relatively low DAC values.
Figure 5B:
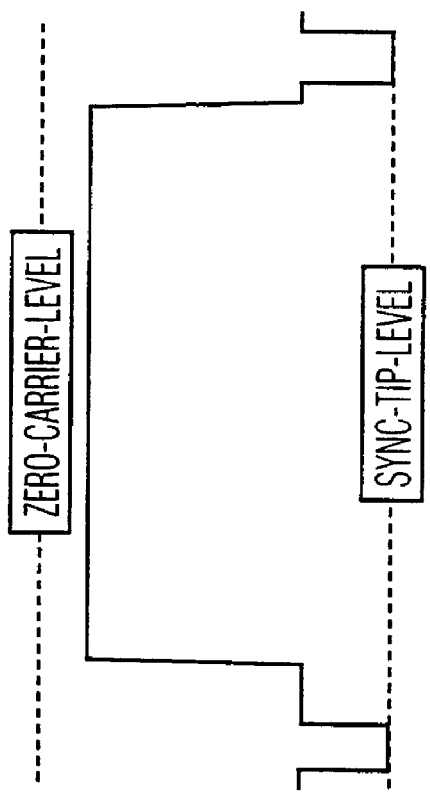
FIG. 5B is a graphical depiction of an output signal of the video level control circuit for relatively high DAC values.
Figure 6:
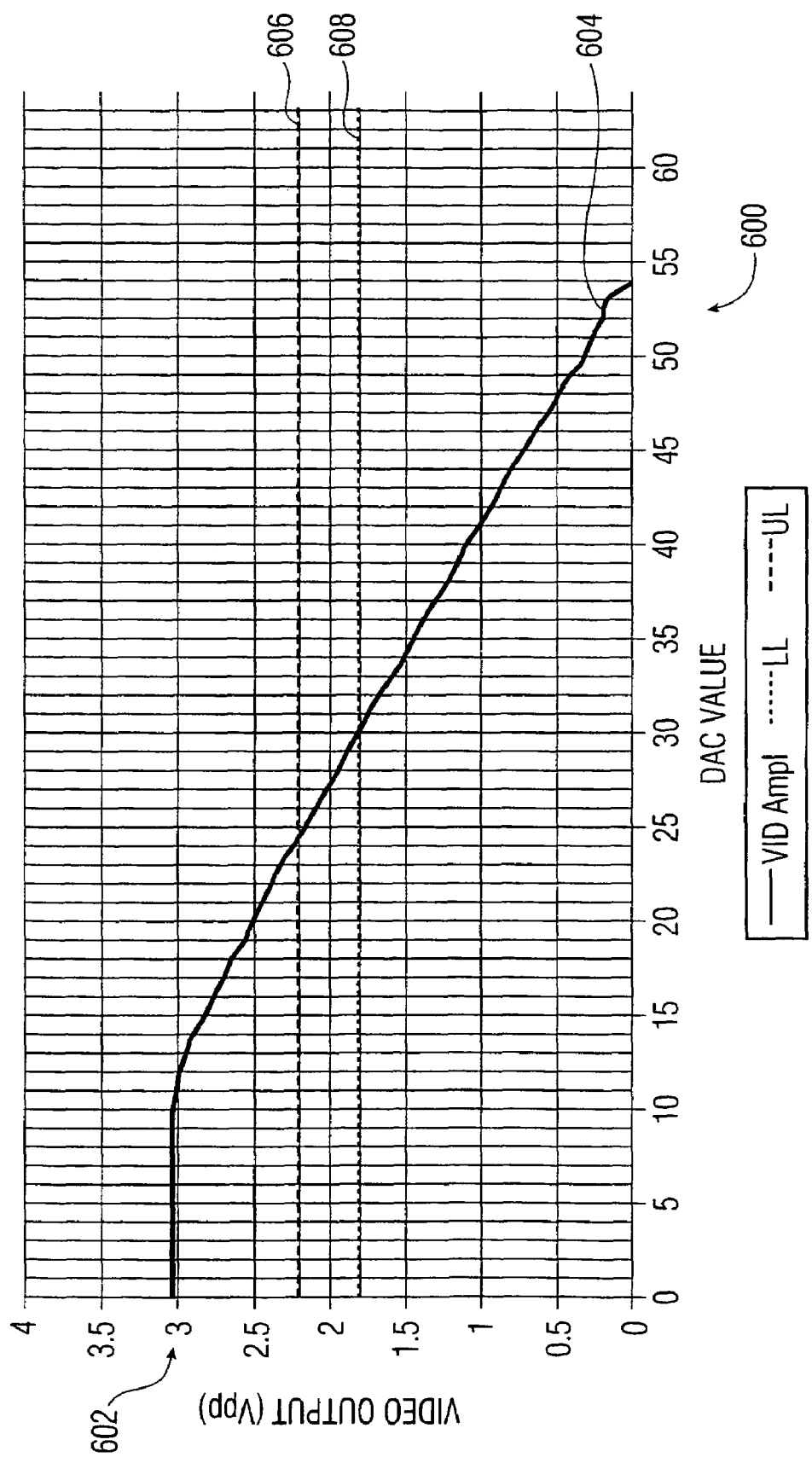
FIG. 6 is a graph of the control voltage (Vc) versus video output level for the circuit of FIG. 5.

The effectiveness of the circuit 112 is depicted in FIG. 6 wherein the control voltage (digital DAC values) are shown on the horizontal axis 600 and the video output values are shown on the left axis 602. As the DAC values increase, the video output amplitude (shown as curve 604) linearly decreases. Such an amplitude decrease occurs because the circuit 112 shifts the DC level of the video. This video level shift shifts the sync-tip level that is used to set the IF AGC gain. Consequently, the IF AGC circuit alters the gain of the IF amplifier (134 in FIG. 1). Typical factory alignment levels are superimposed upon the graph as horizontal dashed lines 6060 (upper level) and 608 (lower level). FIG. 5A depicts a video output signal from module 106 having a relatively low control voltage (less current through resistor R314) and FIG. 5B depicts a video output signal from module 106 having a relatively high control voltage (more current through resistor R314). Clearly, a change in the control voltage of the level circuit 112 effectively varies the video signal amplitude. While the circuit shown in FIG. 4 was designed specifically for the LA7577N, the concept may be applied to other IF AGC integrated circuits where the DC level can be adjusted ahead of the AGC detector.

The present invention provides circuitry that facilitates television receiver signal alignment using a system microprocessor to control the alignment operation through the system I²C bus. The circuitry includes a PIF mute circuit and a video level circuit. The PIF mute circuit and the video level circuit can be controlled by a single control voltage source. As such, the inventive circuitry provides additional signal alignment functionality during factory alignment and testing through the television receiver system's existing microprocessor and I²C bus.

Although various embodiments which incorporate the teachings of the present invention have been shown and described in detail herein, those skilled in the art can readily devise many other varied embodiments that still incorporate these teachings.

What is claimed is:

1. Apparatus for aligning signals in a television receiver comprising:
   a control signal source;
   a mute circuit coupled to said control signal source; and
   a video level circuit coupled to said control signal source, where a first portion of a control signal from said control signal source controls said mute circuit and a second portion of said control signal controls said video level circuit.

2. The apparatus of claim 1 wherein said control signal source comprises a digital-to-analog converter.

3. The apparatus of claim 2 wherein the control signal source further comprises a microprocessor coupled to said digital-to-analog converter through a bus.

4. The apparatus of claim 2 wherein an input to said digital-to-analog converter has multiple bits and a predetermined number of bits is used to control said mute circuit and a remaining range of the analog-to-digital converter is used to control the video level circuit.

5. The apparatus of claim 1 further comprising a gain control loop, wherein said gain of said gain control loop is controlled by said video level circuit.

6. The apparatus of claim 5 wherein said mute circuit is coupled to said gain control loop.

7. The apparatus of claim 1 wherein said video level circuit comprises:
   a buffer circuit;
   a DC level shifting circuit coupled to said buffer circuit.

8. The apparatus of claim 1 wherein said mute circuit, when activated, deactivates an IF AGC circuit.

9. The apparatus of claim 1 wherein said mute circuit, when activated, deactivates both an IF AGC circuit and an RF AGC circuit.

10. A method of providing signal alignment in a television receiver comprising the steps of:
    providing an IF AGC loop having a level shifting circuit and an IF AGC mute circuit; and
    altering the DC level of a video signal within said IF AGC loop in response to a first portion of a control signal; and
    deactivating said IF AGC loop in response to a second portion of said control signal.

11. The method of claim 10 further comprising the step of:
    generating said control signal from a multi-bit digital signal, where a predetermined number of bits is used to control said mute circuit and a remaining number of bits are used to control said level circuit.

12. The method of claim 10 wherein said deactivating step further comprises deactivating an RF AGC loop.

* * * * *